United States Patent
Enger et al.

(10) Patent No.: US 11,493,147 B2
(45) Date of Patent: Nov. 8, 2022

(54) PULL HANDLE BUTTERFLY VALVE LOCKOUT DEVICE

(71) Applicant: Brady Worldwide, Inc., Milwaukee, WI (US)

(72) Inventors: Andrew N. Enger, Muskego, WI (US); Mackenzie Carpenter, Oconomowoc, WI (US); Gene Gladkov, Muskego, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 329 days.

(21) Appl. No.: 16/734,031

(22) Filed: Jan. 3, 2020

(65) Prior Publication Data

US 2021/0207737 A1    Jul. 8, 2021

(51) Int. Cl.
  *F16K 35/10* (2006.01)
  *F16K 31/60* (2006.01)
  *F16K 1/22* (2006.01)

(52) U.S. Cl.
  CPC ............ *F16K 35/10* (2013.01); *F16K 31/602* (2013.01); *F16K 1/221* (2013.01)

(58) Field of Classification Search
  CPC ........ F16K 35/10; F16K 1/221; F16K 31/602; Y10T 137/7131
  See application file for complete search history.

(56) References Cited

U.S. PATENT DOCUMENTS

| 280,912 A | * | 7/1883 | Connolly | ............... | F16K 35/10 |
| | | | | | 70/178 |
| 748,720 A | * | 1/1904 | Glazier | ................... | F16K 35/10 |
| | | | | | 70/178 |

(Continued)

FOREIGN PATENT DOCUMENTS

| CN | 205401745 U | 7/2016 |
| CN | 206904256 U | 1/2018 |

(Continued)

OTHER PUBLICATIONS

Zing Green Products. Pull Handle Butterfly Valve Lockout webpage. Accessed online at https://www.zinggreenproducts.com/lockout-tagout/devices/pull-handle-butterfly-valve-lockout/ on Sep. 14, 2020.

(Continued)

*Primary Examiner* — Reinaldo Sanchez-Medina
*Assistant Examiner* — Nicole Gardner
(74) *Attorney, Agent, or Firm* — Quarles & Brady LLP (57) ABSTRACT

A valve handle lockout device is configured to temporarily lock out a pull handle butterfly valve. The device includes an enclosure body, at least one lock hole, and a blocking wall. The enclosure body includes first and second enclosure portions having an opening at a proximal end of the enclosure body that is dimensioned to surround a base of the pull handle butterfly valve. The lock hole is configured to receive a locking member and thereby secure the device in a closed position on a handle of the pull handle butterfly valve. The blocking wall borders or is near to the opening and is configured to engage the pull handle butterfly valve when the enclosure body is secured in a locked position, thereby preventing removal of the device from the handle and the handle from being operated.

18 Claims, 5 Drawing Sheets

(56) References Cited

U.S. PATENT DOCUMENTS

| | | | |
|---|---|---|---|
| 4,538,434 A | | 9/1985 | Janzen, Sr. et al. |
| 5,003,797 A | * | 4/1991 | Wirth ..................... F16K 35/10 |
| | | | 137/385 |
| 5,165,263 A | * | 11/1992 | Perron .................... F16K 35/06 |
| | | | 70/177 |
| 5,238,141 A | | 8/1993 | Callegari et al. |
| 5,598,724 A | * | 2/1997 | Primeau ................ F16K 35/025 |
| | | | 70/177 |
| 6,206,033 B1 | * | 3/2001 | Chang .................... F16K 35/10 |
| | | | 137/377 |
| 2003/0234043 A1 | | 12/2003 | Miller |
| 2007/0220932 A1 | | 9/2007 | Meekma et al. |

FOREIGN PATENT DOCUMENTS

| | | |
|---|---|---|
| DE | 29818600 U1 | 12/1998 |
| GB | 2369873 A | 6/2002 |
| KR | 20130025107 A | 3/2013 |
| KR | 20170106854 A | 9/2017 |

OTHER PUBLICATIONS

European Patent Office, Extended European Search Report, Application No. 20217593.1, dated May 31, 2021, 10 pages.

\* cited by examiner

PULL HANDLE BUTTERFLY VALVE LOCKOUT DEVICE

CROSS-REFERENCE TO RELATED APPLICATIONS

Not applicable.

TECHNICAL FIELD

This disclosure relates to lock out/tag out devices for restricting the use of flow controls, such as valves.

BACKGROUND

Valve lockout devices are used to prevent changing the state of a valve, such as between a closed position and an opened position. For instance, a valve lockout device may be used to lock a valve in a fully closed position while a technician performs repair or maintenance on a component (e.g., a turbine) that is downstream of the locked-out valve. The valve lockout device provides a visual and a structural impediment to altering the state of the valve by, for instance, blocking access to the control handle of a valve or structurally restricting the physical movement of the control handle.

SUMMARY

An improvement to lock out/tag out devices is disclosed herein which permits a handle of a pull handle butterfly valve to be received in an enclosure. The enclosure may then be secured with one or more locking features such that one or more maintenance personnel may control the status of the valve. Notably, this lock out/tag out device may offer an improved option for securely locking out a valve handle without concern of prying the device off the valve handle during a lock out procedure by implementation of a blocking wall. For example, the device disclosed herein can include a blocking wall that, in some instances, may engage the valve handle to prevent or inhibit relative movement between the device and the valve handle if an attempt to tamper and pivot the locked device off the handle is made. As a result, the blocking wall may prevent the unauthorized removal of the locked device.

In some forms, this lock out/tag out device may further offer an improvement over alternative multi-piece lock out/tag out devices. For example, the device disclosed herein comprises an enclosure assembly that can be constructed as a joined single assembly, even when not used to lock out the valve, by coupling the portions of the enclosure together thereby eliminating the potential for losing an essential component of the device assembly.

According to one aspect, a valve handle lockout device configured to lock out a pull handle butterfly valve is disclosed. The pull handle butterfly valve, for instance, can include a base and a handle having a shaft and an end knob in which the shaft radially extends from a stem received in the base and in which the handle is radially displaceable relative to the stem to selectively lock the stem to the base thereby angularly fixing the stem relative to an axis of the base. The device includes an enclosure body having a proximal end and a distal end. The enclosure body includes a first enclosure portion and a second enclosure portion movably connected to move the enclosure body between an open and closed position. The enclosure body further includes an opening at the proximal end dimensioned to at least partially surround the base. The enclosure body further includes at least one lock hole configured to secure the enclosure body in the closed position and to secure the handle within the enclosure body when a locking member is received through the lock hole. The enclosure body may further include a blocking wall bordering the opening and configured to engage the pull handle butterfly valve when the enclosure body is secured in the closed position, thereby preventing removal of the valve handle lockout device.

In some forms, each of the first and second enclosure portions may extend between the proximal end and the distal end of the enclosure body. However, other configurations are possible. For example, only one of the first or second enclosure portions may extend between the proximal end and the distal end of the enclosure body.

In some forms, the distal end may enclose the end knob and thereby prevents radial movement of the handle when the enclosure body is secured in the closed position.

In some forms, at least one of the first and second enclosure portions may include a lock plate that includes the at least one lock hole extending therethrough and is configured to receive a locking member when the device is in the closed position. In some forms, both the first and second enclosure portions may each include a lock plate such that lock holes of each lock plate are axially aligned when the device is in a closed position and are configured to receive a locking member. The lock plate, for example, may extend radially from the enclosure body and/or be integrally formed with the enclosure body at a midsection between the proximal end and the distal end of the enclosure body. In some forms, the second enclosure portion may include a slot configured to receive a first lock plate of the first enclosure portion. In some forms, the lock plate(s) may include a plurality of lock holes configured to receive a plurality of locking members.

In some forms, the enclosure body may be plastic and/or metal.

In some forms, the blocking wall may be integrally formed with at least one of the first enclosure portion and the second enclosure portion. Further, the blocking wall can be configured to engage at least one of the base, the handle, and the stem so as to help inhibit relative movement of the lockout device relative to the valve handle.

In some forms, the first enclosure portion and the second enclosure portion may be hingedly connected. Further, the shape of the enclosure body may be generally tubular and split into a pair of halves along a central axis.

In some forms, the device may be configured to engage the pull handle butterfly valve when the stem is in any one of a plurality of angular position relative to the axis of the base.

These and still other advantages of the invention will be apparent from the detailed description and drawings. What follows is merely a description of some preferred embodiments of the present invention. To assess the fully scope of the invention the claims should be looked to as these preferred embodiments are not intended to be the only embodiments within the scope of the claims.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
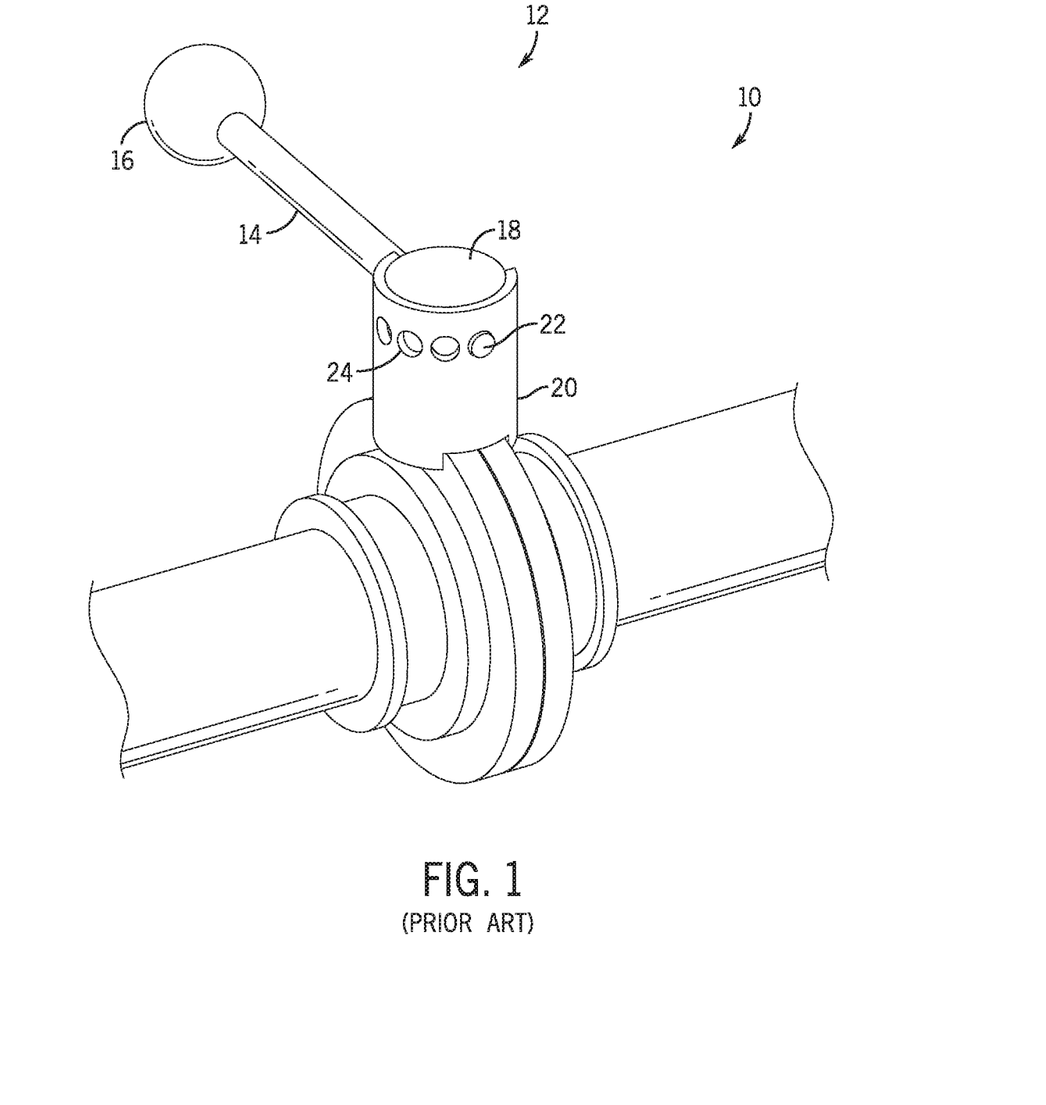
FIG. 1 is a pull handle butterfly valve as is known in the art.

Referring first to FIG. 1, a typical pull handle butterfly valve 10 is shown. The pull handle butterfly valve 10 shown here has a pull handle 12 including a shaft 14 with an end knob 16 at a distal end thereof. This shaft 14 is also coupled to a stem 18 at a proximal end thereof, which stem 18 is rotatably received with a base 20 of the valve body. Although not illustrated in FIG. 1, the stem 18 is connected to a rotatable valve element within the body of the valve 10 such that, when the stem 18 is rotated relative to the valve body by operation of the pull handle 12, the valve element is rotated within the valve body to control the flow of a fluid through the valve 10.

In such a butterfly valve 10, there can be an angular locking mechanism that establishes a limited number of positions for the pull handle 12 and stem 18 relative to the base 20 or the body of the valve. As in the form illustrated, the pull handle 12 itself can be coupled to the stem 18 in such a way (1) that the pull handle 12 is radially displaceable relative to the central axis of the stem 18 while maintaining constant engagement with the stem 18, (2) that the pull handle 12 is biased such that the shaft 14 and end knob 16 of the pull handle 12 are radially drawn towards the central axis of the stem 18 unless the handle 12 is pulled radially outward by a user against the biasing force, and (3) that the pull handle 12 is coupled to a pin 22 on the other side of stem 18 in which the pin 22 projects radially outward from the stem 18 opposite the side of the pull handle 12 and this pin 22 is movable with the movement of the pull handle 12 (that is to say, when the pull handle 12 is pulled radially outward relative to the stem 18 against any biasing force, the pin 22 is drawn into the stem 18). The base 20 can include a plurality of holes 24 which are angularly spaced about the base 20 and which are alignable and engagable with the pin 22, when extended, in various discrete angular positions of the pull handle 12 to fix the angular position of the handle 12 with respect to the body of the valve 10. Accordingly, the various holes 24 can correspond to a plurality of preset valve positions including fully open, fully closed, and/or a number of in-between positions that can correspond to partial flow conditions.

In operation, the handle 12 may be pulled in a radial direction away from the base 20 which disengages the pin 22 from one of the holes 24 by drawing the pin 22 towards the stem 18 and out of engagement with the a corresponding hole 24 in the base 20. With the handle 12 pulled and maintained outward and the pin 22 retracted, the stem 18 is then axially rotatable via rotation of the handle 12 relative to the base 20 to adjust the valve position. The handle 12 may then be released and moved radially inward toward the base 20 with the help of the biasing force to cause the pin 22 to engage another one of holes 24, thereby locking or fixing the valve in one of the plurality of preset discrete valve positions.

It will be appreciated that this is but one example valve structure and such lockout devices as that are now described may be used with other valves in which some form of manipulation of an arm prior to rotation is required in order to use the arm to rotate a valve stem. Thus, while the valve described above is exemplary of the type of valve that could be locked out using the following lockout device, it is not the only type of valve that could be locked out.

Figure 2A:
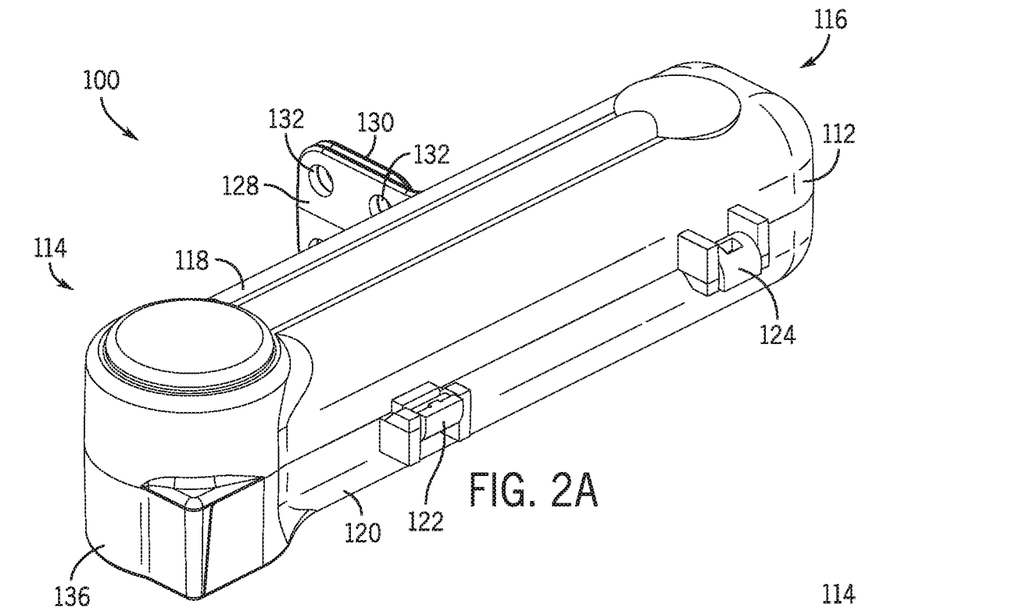
FIG. 2A is a top right perspective view of a valve handle lockout device in a closed position.
Figure 2B:
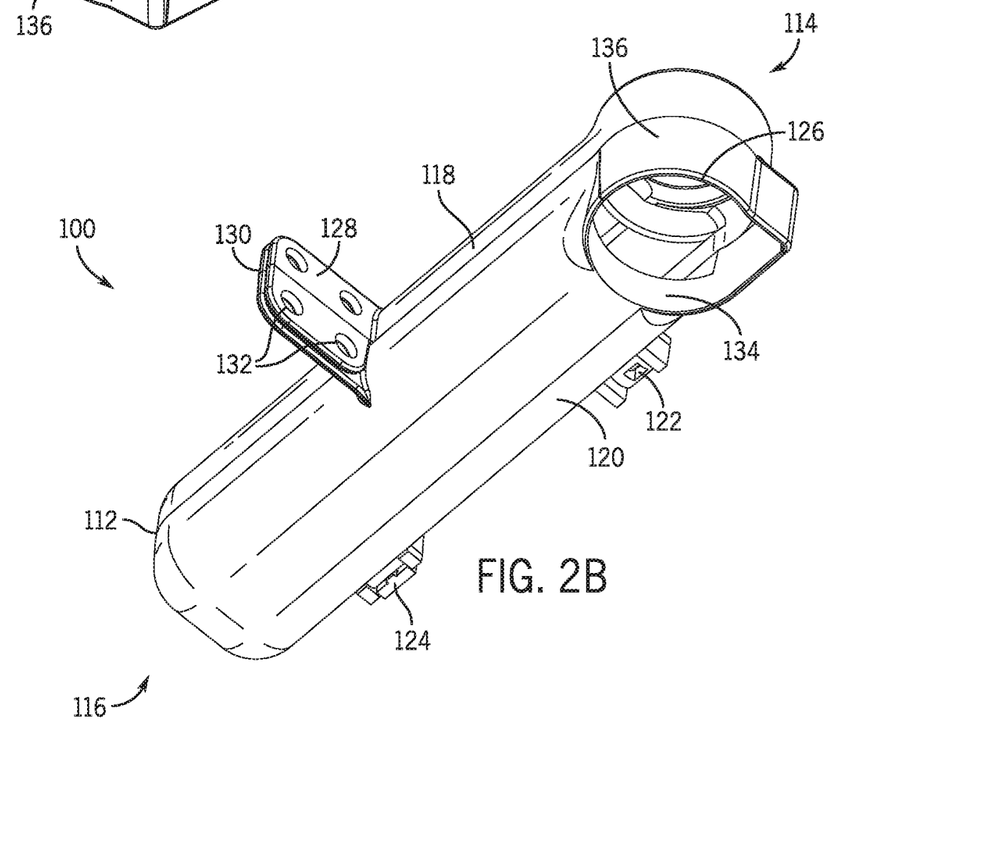
FIG. 2B is a bottom left perspective view of the valve handle lockout device in the closed position.
Figure 3:
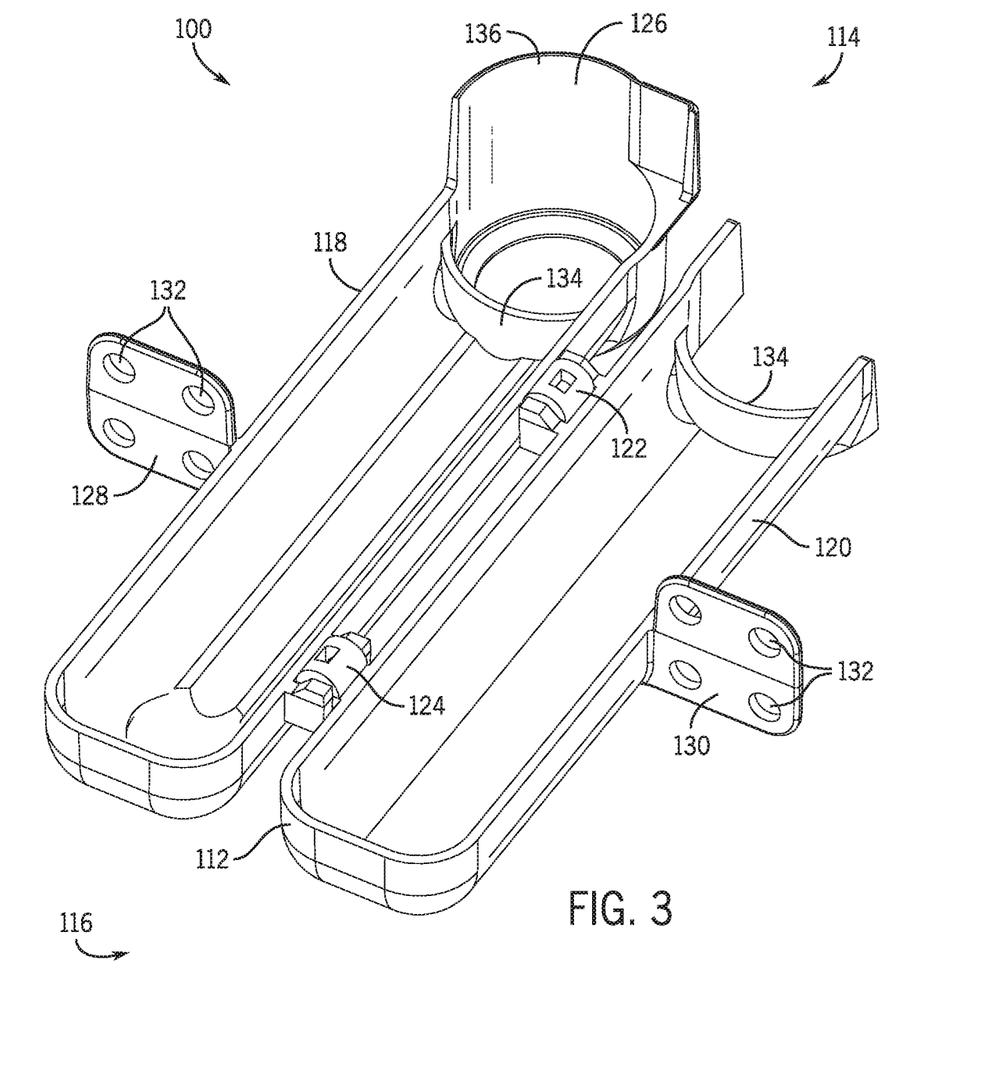
FIG. 3 a perspective view of the valve handle lockout device of FIGS. 2A and 2B in an open position.
Figure 4:
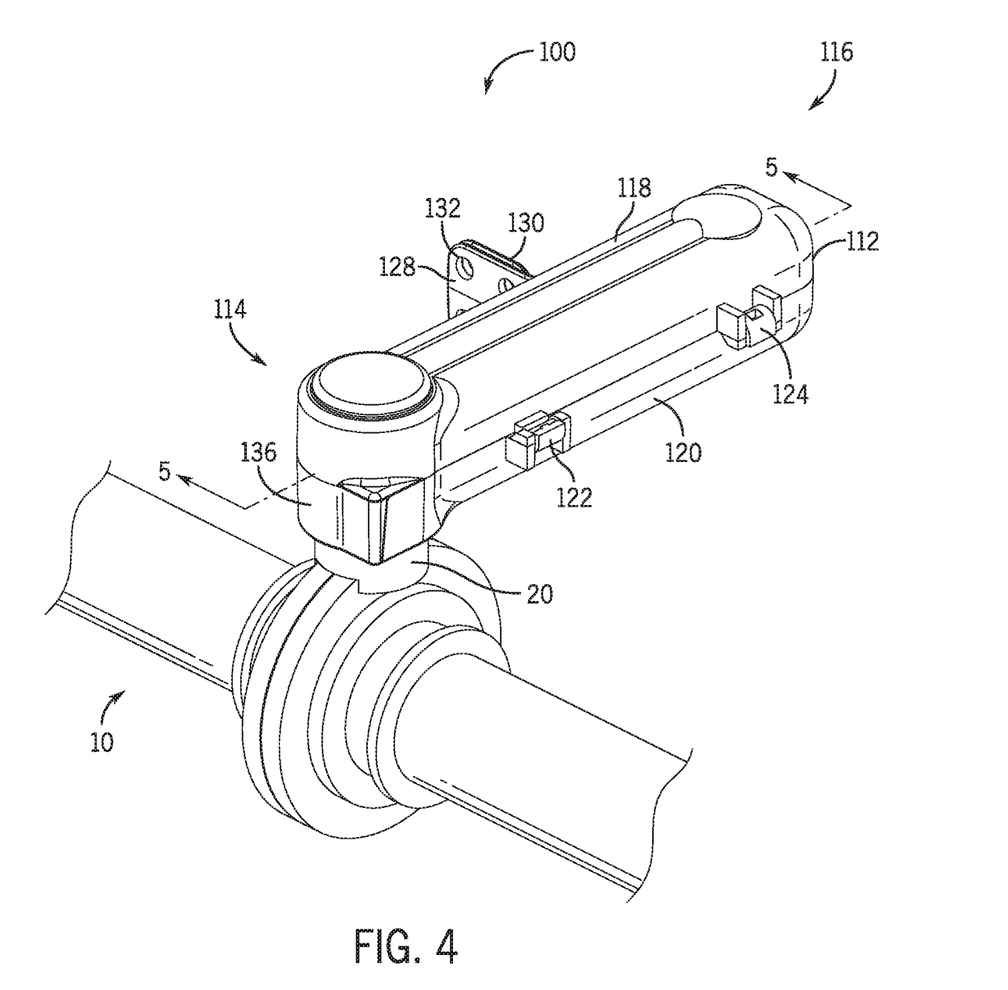
FIG. 4 illustrates the valve handle lockout device of FIGS. 2-3 in the closed position and installed on a pull handle butterfly valve of FIG. 1.
Figure 5:
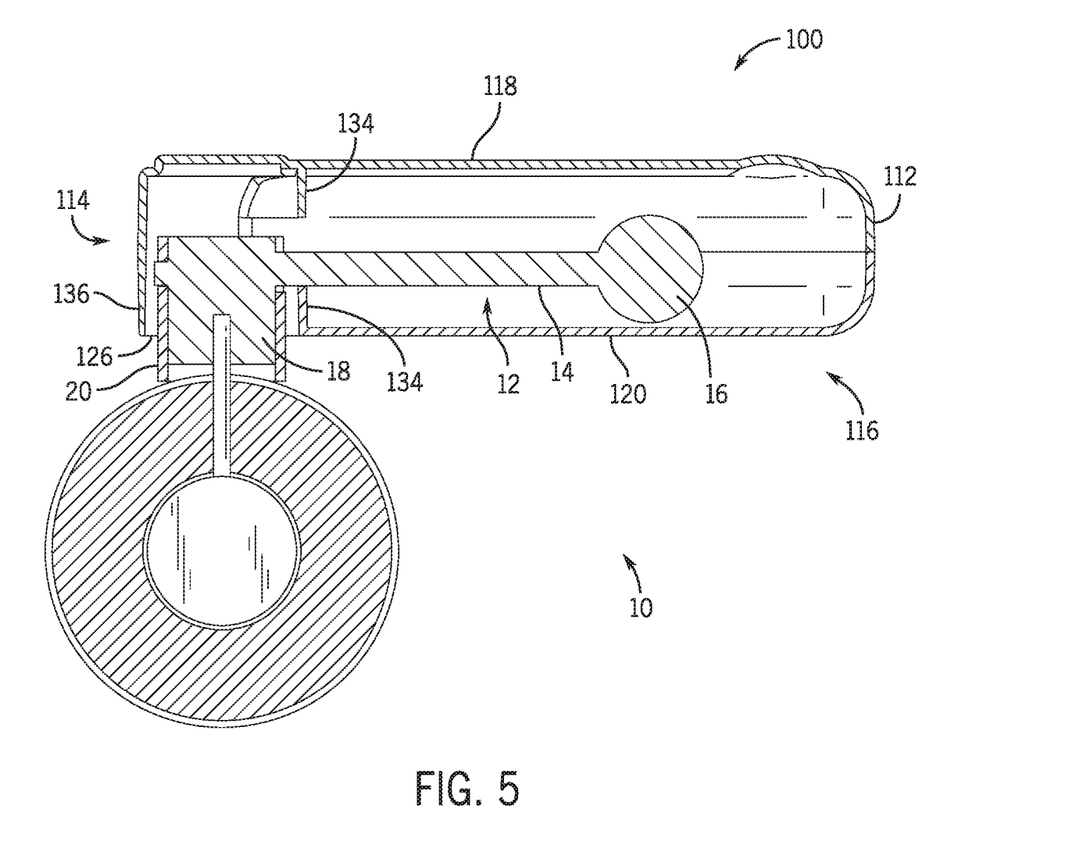
FIG. 5 is a cross sectional side view taken along 5-5 of FIG. 4 with the valve handle lockout device in the closed position and installed on the handle of the pull handle butterfly valve.

Referring now to FIGS. 2A, 2B, and 3, an exemplary valve handle lockout device 100 is illustrated which can be used to temporarily lockout/or tag out the pull handle butterfly valve 10 as illustrated in FIGS. 4 and 5. It is here noted that the internals of the coupling of the pin to the shaft in the stem of the valve 10 are not depicted accurately in the cross-section of FIG. 5, but rather are shown as a solid body for the sake of simplicity in illustration.

The valve handle lockout device 100 includes an enclosure body 112 having a proximal end 114 and a distal end 116. In the illustrated embodiment of FIGS. 2A, 2B, and 3-5, the enclosure body 112 has a generally tubular shape with closed axial ends and that is split down the midline of the tube; however, other configurations and shape are contemplated.

As illustrated, the enclosure body 112 includes a pair of halves or portions including a first enclosure portion 118 and a second enclosure portion 120. In the illustrated embodiment, each of the first enclosure portion 118 and the second enclosure portion 120 extend between the proximal end 114 and the distal end 116. However, in alternative embodiments, the enclosure body 112 may include enclosure portions that extend partially between the proximal end 114 and the distal end 116, that may include more than two parts, and/or that may be otherwise differently shaped or structured while achieving the effects described herein. Thus, it should be appreciated that while as illustrated the first enclosure portion 118 comprises a relative top portion of the enclosure body 112, the second enclosure portion 120 comprises a relative bottom portion, and both are arranged in a general clamshell arrangement, that other configurations and orientations are contemplated as being workable.

As best depicted in FIGS. 2A and 3, the first enclosure portion 118 and the second enclosure portion 120 are movably connected relative to one another by a first hinge assembly 122 and a second hinge assembly 124. In the particular form illustrated, each of the first hinge assembly 122 and the second hinge assembly 124 include an engagement feature configured to be received in a corresponding receiving feature which, as shown, interact in a snap-form manner. As illustrated in FIG. 2A, the engagement feature of the first hinge assembly 122 is included on the first enclosure portion 118 and the receiving feature of the first hinge assembly 122 is included on the second enclosure portion 120. Likewise, the engagement feature of the second hinge assembly 124 is included on the second enclosure portion 120 and the receiving feature of the second hinge assembly 124 is included on the first enclosure portion 118. Especially when the closed device 100 is closed as in the position illustrated in FIG. 3, this can inhibit decoupling of the hinge parts from one another and maintain the integrity of the secured device. In other exemplary embodiments, the enclosure body 112 may include a single hinge configured to movably connect the first enclosure portion 118 and the second enclosure portion 120. Likewise, it is well contemplated that there could be a single pin running between pin-receiving surfaces on each of the halves of the lockout device. Of course, one of ordinary skill in the art will appreciate that various coupling mechanisms may be employed between the parts in question including but not limited to mechanical hinges, living hinges, and other non-hinged coupling mechanisms.

Referring to FIGS. 2B and 3 in particular, the enclosure body 112 further includes an opening 126 at the proximal end 114 of the enclosure body 112. The opening 126 is dimensioned to at least partially surround a base 20 of the pull handle butterfly valve 10 as is illustrated in FIGS. 4 and 5 and serve as a restraint collar. As illustrated, the opening 126 has a generally circular shape that extends axially though the enclosure body 112.

The valve handle lockout device 100 can also further include a securing mechanism for maintaining the device in the closed position (see e.g., FIGS. 2A, 2B, 4, and 5) such as a first lock plate 128 and a second lock plate 130. As shown, the first lock plate 128 extends radially from the first enclosure portion 118 at a midsection between the proximal end 114 and the distal end 118. Similarly, the second lock plate 130 extends radially from the second enclosure portion 120 at a midsection between the proximal end 114 and the distal end 118. As illustrated, each of the first and second lock plates 128, 130 are integrally formed with each of the first and second enclosure portions 118, 120, respectively, however, other configurations are possible.

In other embodiments, a lock plate may extend radially from the first enclosure portion 118 and/or the second enclosure portion 120 at a number of positions at or between the proximal end 114 and the distal end 116. In another embodiment, the valve handle lockout device 100 may include one or more lock plates that extend axially from the distal end 116 of the enclosure body 112. In yet another embodiment, a first lock plate may include a slot configured to receive a second lock plate such that when the second lock plate is received in the first lock plate, a locking member may be used to secure the second lock plate in the first lock plate thereby securing the valve handle lockout device 100 in the closed position. Still further, the securing element need not be lock plates, but could take other forms or geometries.

As can be seen in the exemplary embodiment, each of the first lock plate 128 and the second lock plate 130 include a plurality of lock holes 132. The plurality of lock holes 132 may be dimensioned to receive a plurality of locking members such as a padlock with a shackle. When the enclosure body 112 is in the closed position, the plurality of lock holes 132 of each of the first and second lock plates 128, 130 are aligned (see, for example, FIGS. 2A and 2B). When the plurality of lock holes 132 on each of the first and second lock plates 128, 130 are aligned, one or more locking members may be received by both of the first lock plate 128 and the second lock plate 130 thereby securing the valve handle lockout device 100 in the closed position in combination with the hinge on the opposing side. As illustrated, the valve handle lockout device 100 includes four lock holes 132 on each of the first and second lock plates 128, 130, however, the lock plates may include any number of lock holes. Multiple holes can be particularly useful, however, as this allows for various users to separately lock a single device 100 with unique locks and only when all of the users have removed his or her unique lock is the device 100 removable from the valve 10.

Notably and as is well illustrated in FIG. 3, the inside of the device 100 include one or more blocking walls 134. The blocking walls 134 are located at a distal side of the opening 126 on each enclosure portion proximate the central axis of the valve 10 and extend substantially perpendicularly inward relative to axis the body 112 and the handle 12. As illustrated, the blocking walls 134 are integrally formed with the enclosure portions, however, they could be formed separately. Likewise, other non-perpendicular orientations are possible and only one of the halves may have a blocking wall. For example, a blocking wall may extend substantially perpendicularly inward into the enclosure body and be integrally formed with just one of the first or second enclosure portions.

In use and as illustrated in FIGS. 4 and 5, the blocking walls 134 or wall is configured to engage the pull handle butterfly valve 10 in such a way as to prevent removal of the valve handle lockout device 100 from the lockout device 100 when the lockout device 100 secured in a closed position on a handle 12 of the pull handle butterfly valve 10.

With reference to FIG. 4, the valve handle lockout device 100 is installed on the handle 12 and protruding base 20/stem 18 when the handle 12 is in a single position and it is desired that the handle 12 not be usable to operate the valve 10. It should be appreciated that the valve handle lockout device 100 is configured to be installed on and lock out the pull handle butterfly valve 10 in any number of positions including fully open, fully closed, and a plurality of preset valve positions in between. It should also be appreciated that the valve handle lockout device 100 may be constructed from metal and/or plastic through a number of manufacturing processes including injection molding, over-molding, casting, and so forth.

Referring now to FIG. 5, when the valve handle lockout device 100 is installed, the distal end 116 of the enclosure body 112 is dimensioned to receive the end knob 16 of the shaft 14 that extends radially from the stem 18 of the handle 12. The shaft 14 is fully enclosed within the enclosure 112 thereby preventing an operator from pulling the handle 12 radially and adjusting the position of the pull handle butterfly valve 10. This movement is further prevented by the presence of the proximal side wall 136 which prevents shifting of the device relative to the valve 10.

As illustrated, the operator is also prevented from removing the valve handle lockout device 100 from the pull handle butterfly valve 10 while in the closed position by tilting of the lockout device 10. Specifically, if the distal end 116 of the valve handle lockout device 100 is pivoted downward relative to the base 20 and the proximal end 114 lifted, the blocking wall 134—especially the lower blocking wall—will engage the base 20 and/or the shaft 14 thereby preventing removal of the device 100 from the valve 10. In some examples, the blocking wall 134 may engage the handle 12, the stem 18, and/or the base 20, when an operator attempts to remove the valve handle lockout device 100 from the pull handle butterfly valve 10 in the closed position. In any event, the addition of the blocking wall especially prevents the movement or removal of the lockout device 100 from the valve 10 or the possible operation of the handle 12 when the lockout device 100 is secured.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A valve handle lockout device configured to lock out a pull handle butterfly valve, the pull handle butterfly valve including a base and a handle having a shaft and an end knob, the shaft radially extending from a stem received in the base in which the handle is radially displaceable relative to the stem to selectively lock the stem to the base and thereby angularly fixing the stem relative to an axis of the base, the valve handle lockout device comprising:
   an enclosure body having a proximal end and a distal end, the enclosure body including a first enclosure portion and a second enclosure portion movably connected to move the enclosure body between an open and closed position, and an opening at the proximal end dimensioned to at least partially surround the base;
   at least one lock hole configured to secure the enclosure body in the closed position and secure the handle within the enclosure body when a locking member is received through the at least one lock hole; and
   a blocking wall bordering the opening at the distal side of the opening and extending substantially perpendicularly inward relative to a central axis of the enclosure body, the blocking wall configured to engage the pull handle butterfly valve when the enclosure body is secured in the closed position, thereby preventing removal of the valve handle lockout device.

2. The device of claim 1, wherein the first enclosure portion extends between the proximal end and the distal end.

3. The device of claim 1, wherein the second enclosure portion extends between the proximal end and the distal end.

4. The device of claim 1, wherein the distal end is configured to enclose the end knob, thereby preventing radial movement of the handle when the enclosure body is secured in the closed position.

5. The device of claim 1, wherein the first enclosure portion includes a first lock plate; and
   wherein the at least one lock hole extends through the first lock plate.

6. The device of claim 5, wherein the second enclosure portion includes a second lock plate; and
   wherein a second lock hole extends through the second lock plate and is axially aligned with the at least one lock hole when the enclosure body is in the closed position.

7. The device of claim 6, wherein the first lock plate and the second lock plate extend radially from the enclosure body.

8. The device of claim 7, wherein the first lock plate and the second lock plate are integrally formed with the enclosure body at a midsection of the enclosure body between the proximal end and the distal end.

9. The device of claim 5, wherein the second enclosure portion includes a slot configured to receive the first lock plate when the enclosure body is in the closed position.

10. The device of claim 1, wherein the at least one lock hole is a plurality of lock holes configured to receive a plurality of locking members.

11. The device of claim 1, wherein the enclosure body is plastic.

12. The device of claim 1, wherein the enclosure body is metal.

13. The device of claim 1, wherein the blocking wall is integrally formed with at least one of the first enclosure portion and the second enclosure portion.

14. The device of claim 1, wherein the blocking wall is configured to engage the base when the enclosure body is secured in the closed position.

15. The device of claim 1, wherein the blocking wall is configured to engage the handle when the enclosure body is secured in the closed position.

16. The device of claim 1, wherein the first enclosure portion and the second enclosure portion are hingedly connected.

17. The device of claim 1, wherein the first enclosure portion and the second enclosure portion form a tubular shape when the enclosure body is in the closed position.

18. The device of claim 1, wherein the blocking wall is configured to engage the pull handle butterfly valve when the stem is in any one of a plurality of angular positions relative to the axis of the base.

\* \* \* \* \*